Nov. 24, 1931.   A. W. WAERN   1,833,386
SMELTING APPARATUS
Filed March 15, 1930   3 Sheets-Sheet 3
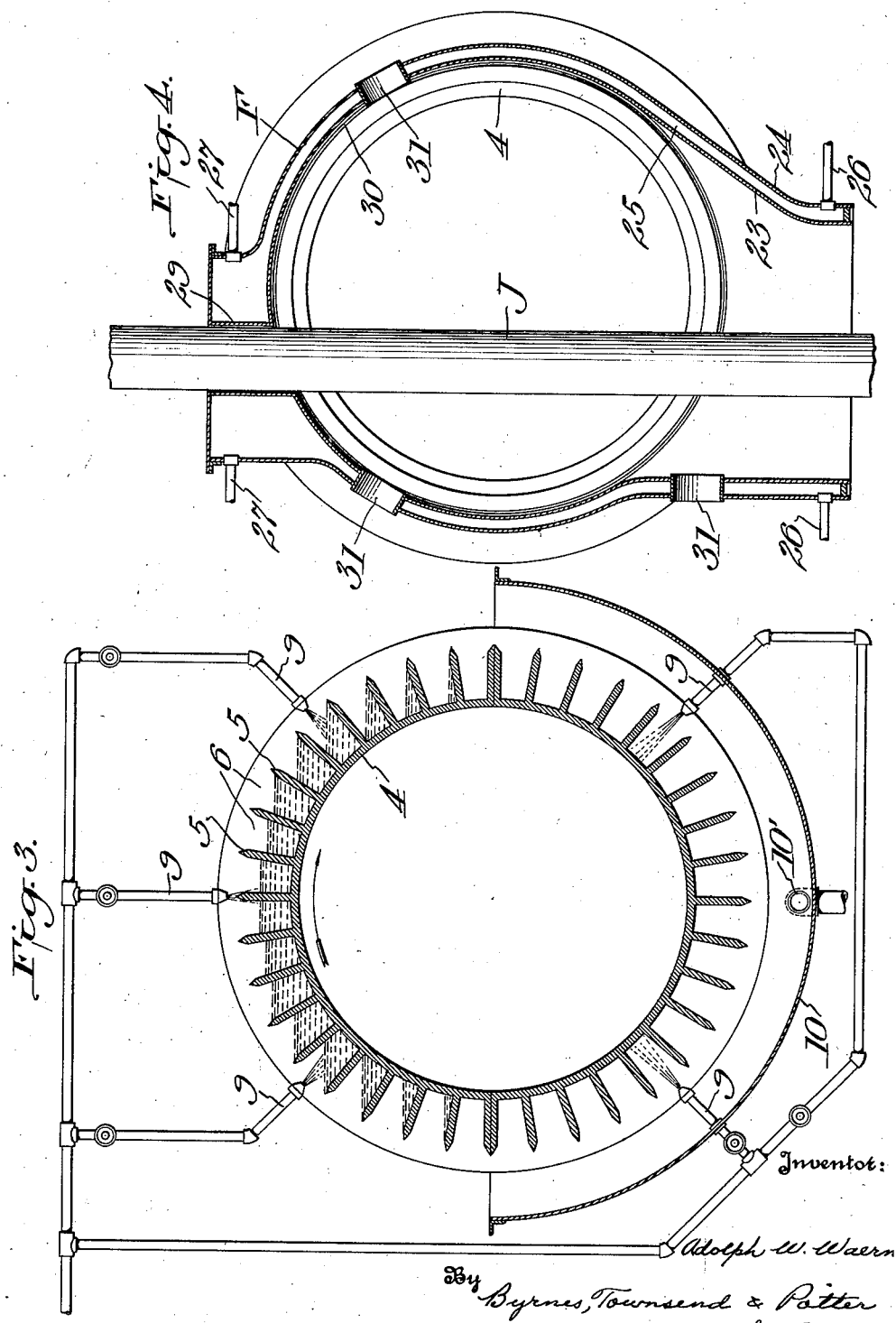

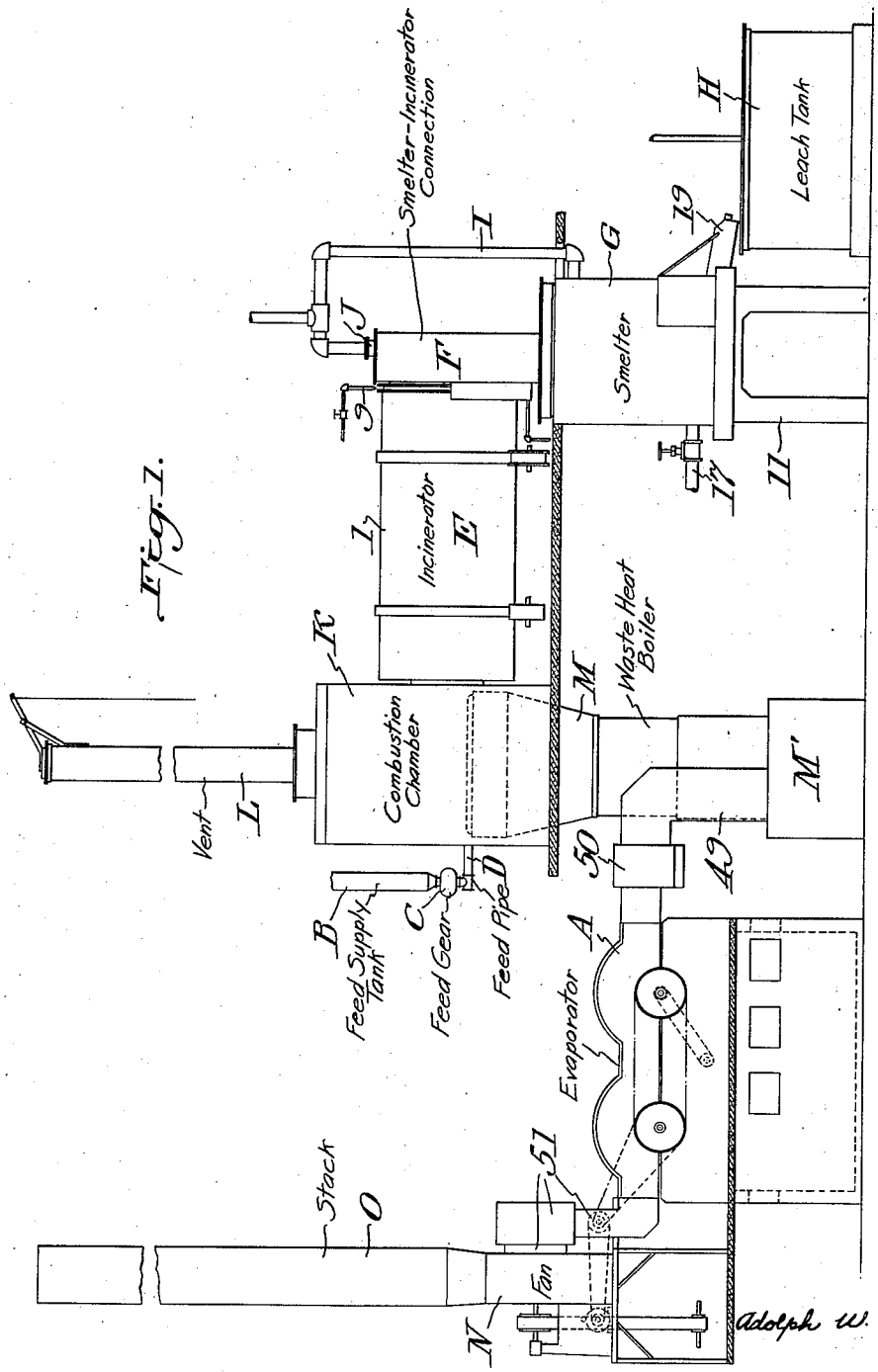

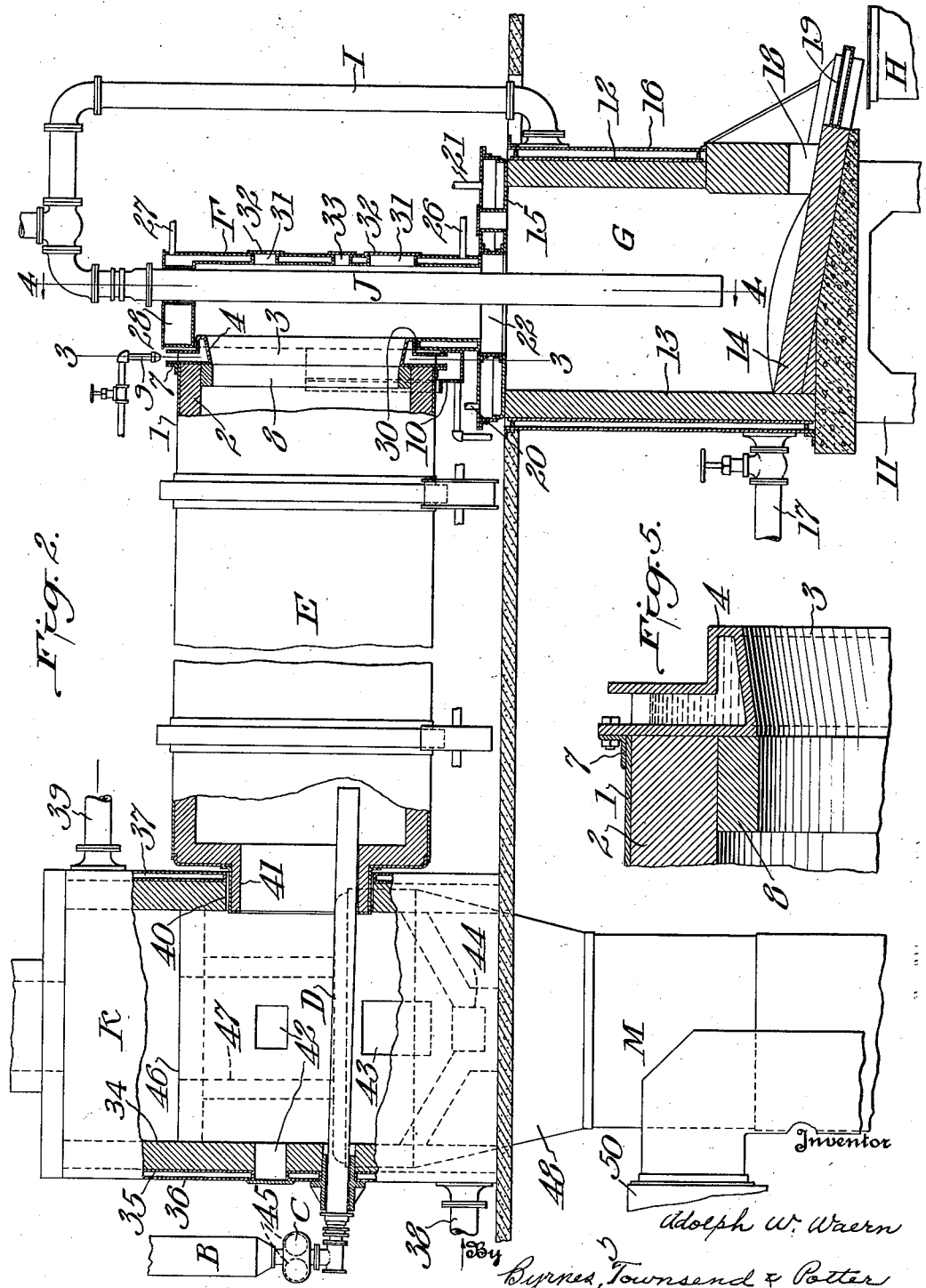

Patented Nov. 24, 1931

1,833,386

UNITED STATES PATENT OFFICE

ADOLPH W. WAERN, OF CANTON, NORTH CAROLINA, ASSIGNOR TO THE CHAMPION FIBRE COMPANY, OF CANTON, NORTH CAROLINA, A CORPORATION OF OHIO

SMELTING APPARATUS

Application filed March 15, 1930. Serial No. 436,099.

The present invention relates to a system of apparatus adapted for use in processes involving the smelting of carbonaceous materials for recovery of their inorganic chemical values. More particularly, the invention comprises a water-cooled lip for a substantially horizontal rotatable furnace, water-cooled means for connecting revolvable horizontal furnaces with stationary furnaces, and a complete system of recovery apparatus embodying the aforesaid features.

The invention will be illustrated in connection with a specific system of apparatus adapted for use in the recovery of sodium compounds from the by-product black liquor from the sulfate process of producing chemical wood pulp, it being understood, however, that the invention is equally applicable in other processes of the types including the recovery of inorganic compounds from the by-product liquor obtained from the soda process of producing chemical wood pulp, the recovery of potash from molasses or from tartaric acid residues, the production of sodium sulfid, and the like, involving combustion of mixed organic-inorganic matters whereby to obtain their inorganic contents.

The typical recovery process selected for illustration of the present invention,—that is, the process of reclaiming the sodium constituents of black liquor,—involves the steps of:

1. Concentrating the black liquor by evaporation;
2. Burning the concentrate;
3. Smelting the resulting burned residue ("black ash") in a controlled atmosphere (either reducing or oxidizing); and
4. Leaching out of the resulting smelt its content of soluble sodium compounds.

It is the practice to add sodium chemical,—for making up losses in the pulping process,—to the material undergoing treatment at some stage of the recovery procedure prior to smelting. For carrying out this process it already is known to incinerate the concentrated black liquor (which contains the combustible non-cellulosic organic components of wood) in a substantially horizontal rotatable furnace, the concentrated black liquor being fed into the furnace in a stream and the incinerated product ("black ash") being delivered from the furnace onto a table or floor or into a pit from whence it is moved to the vicinity of the charging stage of a smelting furnace, mixed with fresh sodium chemical, and eventually charged (usually by hand and after cooling) into said smelting furnace. It likewise has been proposed to conduct the highly heated gases given off from the smelting furnace by the blasting of the smelt with heated air, or the like, directly from said smelting furnace and into and through the incinerating furnace through which latter they travel counter-currently to and in direct contact with the concentrated black liquor undergoing incineration.

The aforesaid process requires the use of relatively very high temperatures, particularly during the smelting and incinerating stages, which temperatures may and usually do tend to make short the life of the furnace linings and of those metal parts of the furnace which come into direct contact with the highly heated gases.

The present invention resides, in its broadest sense, in the provision of a water-cooled lip,—more specifically, the water-cooled discharge lip,—for a revovable furnace of the horizontal kiln type, making possible the closed coupling of such a furnace with a stationary furnace such, for instance, as a vertical smelting furnace. The provision of said means in cooperation with a coolable closed connection between incinerating furnace and smelting furnace makes possible the positioning of the discharge end of the former above the latter whereby the solid material discharged from the former may drop or otherwise gravitationally descend into the latter and the gases given off from the latter freely may ascend into the former. With such a relationship obtaining between the two furnaces it is possible to conserve the heat of the discharged black ash, the black ash automatically being charged directly into the smelting furnace without dissipation of its heat; also, the necessity of handling the black ash is entirely obviated.

The invention will be described hereinafter with greater particularity in connection with the appended drawings in which:

Fig. 1 is a schematic representation, in side elevation, of a complete system of apparatus embodying the present invention;

Fig. 2 is a fragmentary side elevational view, partly in cross-section, of an assembly comprising a rotatable incinerating furnace, a stationary smelting furnace, and a closed connection therebetween.

Fig. 3 is a transverse sectional view of the structure shown in Figure 2, taken substantially on line 3—3 of said figure;

Fig. 4 is a transverse sectional view of the structure shown in Fig. 2, taken substantially on line 4—4 of said figure; and Fig. 5 is an enlarged fragmentary sectional detail illustrating the lip of the incinerating furnace.

According to Fig. 1, which represents a complete system of apparatus for recovering the sodium constituent of black liquor, and considering the system from the standpoint of the progress of the material undergoing the treatment: A represents a conventional multiple-disc evaporator; B represents a feed supply tank for concentrated black liquor; C is a feed gear for moving in predetermined measured quantities the evaporated black liquor from the feed supply tank to the feed pipe D which latter may be a conventional water-jacketed pipe; E is an incinerator, being a substantially horizontal revolvable furnace; F represents a closed smelter-incinerator connection; G is a jacketed smelter; and H is a leach tank. Considering the system from the standpoint of the passage of gases: I is a conduit for leading pre-heated air from the jacket of smelter G to the water-cooled blow pipe J; K is a combustion chamber, which may or may not be jacketed for pre-heating the air supplied to blowpipe J; L represents a conventional vent; M represents a waste-heat boiler; and N is a fan connecting with stack O.

The crux of the present invention resides in the provision of the above-alluded to means for coupling a rotatable furnace to a stationary furnace; viz., to the provision of a water-cooled lip member for the rotatable furnace, and, in cooperation with the water-cooled lip member, the before-mentioned incinerator-smelter connection. These salient features will be described in greater particularity in connection with the following description of the incinerator and the smelter.

The incinerator E is, generally, the conventional, substantially horizontal, rotatable furnace including an outer metallic shell 1 provided with a heat resisting and heat-insulating lining 2. At the discharge orifice 3, which preferably should offer the minimum obstruction to the free passage of both solids and gases, there is secured to the furnace shell 1 an annular lip member 4 providing a channel having in horizontal cross-section substantially the shape of an L the annular inner surface over which products are adapted to pass from the incinerator into the smelter being of less diameter at its incinerator-adjacent edge than at its outer edge to thus provide an annular lip of substantially frusto-conical form, or bell mouth, and being open at its periphery, said annular lip member being provided with a plurality of equally-spaced webs or partitions 5 extending radially outward from its frusto-conical portion and terminating short of the periphery of the lip member to define a plurality of circumferentially disposed pockets 6. Said annular lip member, which may if desired be fabricated from a plurality of sections or may be unitarily constructed, may be formed from cast iron, or steel, or an equivalent metal or alloy, or other suitable material, and is suitably secured to the incinerator in an appropriate manner as by means, for example, of an annulus 7. The incinerator lining 2 is fitted to the side of the annular lip member 4, and is brought substantially flush with the frusto-conical portion of said lip member by means of suitable insulation ring 8. A plurality of valve-controlled water sprays 9 are positioned about the discharge end of the incinerator E in alignment with the open periphery of the lip member 4 so as to project a spray of cooling liquid into the said pockets 6. 10 is a stationary waste water pan for receiving water discharged directly or indirectly from sprays 9, said pan being provided with drain 10'. The said waste water pan 10 substantially closes said lip member to a height sufficient to catch the spill of cooling fluid from webs 5 during rotation of the lip.

The stationary smelter G, which is mounted on a suitable base 11, comprises an outer shell 12 preferably of sheet metal such as steel, a lining 13 of suitable material, such as soapstone, or soapstone and concrete, an inclined hearth 14, preferably formed of a combination of soapstone and concrete, and a furnace cover 15. About the shell 12 there may be disposed a jacket 16 provided with valved inlet conduit 17 and discharge conduit I for the circulation of air about the shell 12. An opening 18 through the lining 13 and shell 12 at the low side of the inclined hearth 14 communicates with an inclined water-cooled spout 19. Projecting downwardly into the smelter G is the water-cooled blow pipe J which communicates at its upper end with a source of heated air which source may be the air space between the jacket 16 and the shell 12 of the smelter G as by means of the conduit I as shown, or may be any suitable means for heating air.

The cover 15 of the smelter G may be, and preferably is, a closed pan constructed of sheet metal such as iron, steel or the like and provided with suitable connections 20 and 21 for the ingress and egress of cooling water. The smelter may, however, be closed at the top by other appropriate means. An opening 22 of a size sufficient to accommodate the lower end of the incinerator-smelter connection F, hereinafter more fully described, is provided in the cover 15, and is adapted to permit passage through it in one direction of the products of incinerator E and in the other direction of the gases from smelter G, the size of the opening being sufficient, moreover, to permit of the passage therethrough of the blow-pipe J without constriction.

The smelter-incinerator connection F—see particularly Figs. 2 and 4—comprises, in the form shown, an inner shell 23 and an outer shell 24 arranged in spaced relation and suitably connected in fluid-tight manner to provide between them a space 25 for the reception of a cooling fluid, preferably water, which may be introduced into and discharged therefrom by means of pipes 26 and 27, respectively. Inasmuch as the upper portion of this member is subjected to the greatest heat of the gases the cooling space is materially enlarged, as indicated at 28, and in addition provides, as at 29, a sleeve for the reception of the blowpipe J. The inner face of the connection member F is provided with an opening 30 into which extends the frusto-conical portion of the lip 4 with a rotative fit sufficiently exact to prevent passage of air or other gases therearound. The lower portion of the connection member F is somewhat contracted, as shown particularly in Fig. 4, and forms a gas-tight connection with the opening 22 in the smelter cover 15 as hereinbefore indicated. For the purpose of introducing air, in appropriately controlled quantities, to the incinerator E, the connection member F is provided with appropriately located air inlets 31, provided with gates or covers 32 (Fig. 2) so mounted as to be capable of adjustment for appropriately regulating the amount of air passing through said openings. Peep-holes such as that shown at 33 (Fig. 2) may be provided at appropriate locations in the member F so that the progress of the treatment of the materials within incinerator E may be observed. Any of the openings 31 or 33 may if desired be used also for the introduction of appropriate temperature-indicating devices.

In the form of the apparatus shown, the blowpipe J extends into the smelter G through the connection member F, as described. However, if desired, this blowpipe may extend into the smelter G without passing through the connection member F.

The combustion chamber K comprises a masonry or other fire-repellant wall or liner 34 sheathed as indicated at 35, and provided, if desired, with a jacket 36 between which and the sheathing 35 may be formed a space 37 into which air may be introduced and drawn off through appropriate conduits 38 and 39, respectively. In the wall of chamber K adjacent the incinerator E is an annular opening 40 into which extends, with a substantially gas-tight rotative fit, a cylindrical extension 41 of the incinerator E, whereby the gases passing through the incinerator may be introduced into the combustion chamber K. Suitable openings, such as those shown at 42, 43 and 44, may be formed in the walls of the chamber K to provide peep holes and clean out openings at appropriate positions therein.

The concentrated black liquor supplied to feed tank B is, as hereinbefore indicated, passed, in measured quantities, or at an appropriately regulated rate of feed, into the feed pipe D, which extends through the combustion chamber K and into the incinerator E through the cylindrical extension 41 thereof, and terminates within the incinerator E as shown in Fig. 2. The regulation of the feed of black liquor is controlled by means of a feed gear which, in the form shown, has substantially the characteristics of an ordinary gear pump, the gears 45 of which may be driven at a speed appropriate for the desired rate of feed of the black liquor, by means of any usual or appropriate drive mechanism,—not shown.

The combustion chamber K is provided with a laterally-offstanding leg 46 through which the combustion gases passing from the incinerator E into the combustion space K are conducted by means of a stack 47 into the shell 48 of the waste-heat boiler M whereby the heat of these gases may be utilized for the generation of steam for power or other purposes. The thus utilized gases pass from the furnace base M' into a conduit 49 by which they are conducted through a connector 50 into the multiple-disc evaporator A wherein they give up substantially the remainder of their available heat and from which they are drawn through suitable connections 51 by the fan N and exhausted thence through stack O. It will thus be noted that the fan N exerts a suction upon the combustion gases throughout the entire apparatus, thus causing them to pass through such apparatus in a manner to provide the greatest efficiency.

The operation of the system of apparatus illustrated in Fig. 1 as applied to the recovery of sodium compounds from black liquor is as follows: The by-product black liquor is concentrated by evaporation in the evaporator A by contact with the gases from waste heat boiler M, which gases may enter the evaporator at a temperature of about 550° F., to, say, about 30° Bé. at 80° C.; the concentrated black liquor,—to which there may be and usually is added fresh sodium chemical for making up process losses,—is transferred to feed supply tank B and therefrom fed in predetermined quantity through feed pipe D into the interior of revolvable incinerator E, where it becomes wholly dehydrated, and to some extent burned, in the incinerator's oxidizing atmosphere which consists of a highly heated mixture of gases drawn from the smelter G to which has been added an appropriate amount of supplemental air admitted into the system through openings 31. A temperature of about 1300° F. usually obtains at the entrance of the incinerator, while the temperature at the exit end usually varies between about 1500° F. and 2500° F. The black ash discharges by gravity from incinerator E over the water-cooled lip member 4 and through the connection member F into the smelter G where its content of carbon is burned in a blast of heated air of controlled volume whereby to yield a reducing atmosphere. The thus freed inorganic chemical content of the black ash becomes molten at the temperature maintained within the smelter,—usually, in excess of 2500° F.—and flows down the inclined hearth 14 of the smelter G through opening 18 and over the spout 19 into the leach tank H.

As has been indicated hereinbefore, heated air for use in blowpipe J may be obtained by drawing air into a jacket 36 about combustion chamber K through conduit 38 and from the said jacket through conduit 39 to the conduit I, or from any other appropriate and suitable source.

It will be understood that the member F is in effect but a vertically extended portion of the smelter G, and that in consequence thereof the invention comprises connecting in a substantially gas-tight manner a horizontal rotatable furnace with the upper portion of a vertical stationary furnace by means of a cooled lip carried by and rotatable with said horizontal furnace, which cooled lip projects into said stationary furnace through an opening in the latter in substantially gas-tight association therewith.

It will be understood further that the invention is not restricted to the one specific embodiment thereof particularly illustrated and described above, but that the invention is capable of modification as to structure and as to arrangement of the cooperating parts without departure from the scope of the invention as defined by the following claims.

I claim:

1. In a smelting apparatus including a horizontal rotatable furnace and a stationary vertical furnace, means providing a substantially gas-tight passage therebetween, including a member carried by and rotatable with said horizontal furnace and extending within the upper portion of said vertical furnace in substantially gas-tight association therewith, the member carried by said horizontal furnace providing a chamber divided into a plurality of pockets for the reception of a cooling medium.

2. In a smelting apparatus including a horizontal rotatable furnace and a stationary vertical furnace, means providing a substantially gas-tight passage therebetween, including a member carried by and rotatable with said horizontal furnace and extending within the upper portion of said vertical furnace in substantially gas-tight association therewith, the member carried by said horizontal furnace providing a chamber divided by a plurality of webs into a plurality of pockets, means for supplying cooling medium to said pockets, said cooling medium being retained by said pockets during a portion of the rotation of said incinerator, and means for catching said cooling medium as it is discharged from said pockets.

3. In a smelting apparatus including a horizontal rotatable incinerator furnace and a vertical stationary smelter furnace provided with a tight cover, means providing a passage between said furnaces, including a member carried by and rotatable with said horizontal incinerator furnace and having a lip, and a smelter-incinerator connection member vertically projected from an opening in the cover of said smelter and consisting essentially of inner and outer shells arranged in spaced relation and suitably connected in fluid-tight manner to provide between them a space for the reception of a cooling fluid, said connection member being provided near its upper end with an opening through which the said lip extends in substantially gas-tight association therewith.

4. In a smelting apparatus including a horizontal rotatable furnace and a stationary vertical furnace, means providing a substantially gas-tight passage therebetween through which heated gases may pass from said stationary furnace to said rotatable furnace, including a member carried by and rotatable with said horizontal rotatable furnace and having a lip extending within the upper portion of said vertical furnace in substantially gas-tight association therewith, said lipped member being hollow and provided with means for retaining therein a body of cooling medium in the uppermost zone thereof and for completely discharging the cooling medium at the lowermost zone thereof in one complete revolution of said lip member, and means for supplying cooling medium to said lip member at said uppermost zone.

5. In a smelting apparatus including a horizontal rotatable furnace and a stationary vertical furnace, means providing a substantially gas-tight passage therebetween through which heated gases may pass from said stationary furnace to said rotatable furnace, including a member carried by and rotatable with said horizontal rotatable furnace and having a lip extending within the upper portion of said vertical furnace in substantially gas-tight association therewith, said lipped member being hollow and provided with means defining therein a plurality of pockets for retaining therein a body of cooling medium in the uppermost zone thereof.

6. In a smelting apparatus including a horizontal rotatable incinerator furnace and a vertical smelter stationary furnace provided with a hollow-walled cover arranged for the reception of cooling fluid, means providing a substantially gas-tight passage between said rotatable furnace and said stationary furnace, including a member carried by and rotatable with said horizontal incinerator furnace and having a lip and arranged for the reception of cooling fluid, a smelter-incinerator connection member vertically projected from an opening in the said hollow-walled cover and consisting essentially of inner and outer shells arranged in spaced relation and suitably connected in fluid-tight manner to provide between them a space for the reception of cooling fluid, said connection member being provided near its upper end with an opening through which the said lip extends in substantially gas-tight association therewith, and means for passing cooling fluid into and out of said cover, lip, and connection member.

7. A cooled lip for a rotary horizontal furnace, comprising a hollow body provided with a plurality of webs dividing its interior into a plurality of pockets for the reception of a cooling medium.

8. A cooled lip for a rotary horizontal furnace, comprising a hollow body having its interior divided by radial webs into a plurality of pockets for the reception of a cooling medium during a portion of the rotation of said furnace.

9. A cooled lip for a rotary horizontal furnace, comprising a hollow body having a bell-mouthed discharge orifice, and means including a plurality of radial webs dividing the interior of said body into a plurality of pockets for retaining a body of cooling medium in contact with said orifice within said body during a portion of the rotation of said furnace.

10. A cooled lip assembly for a rotary horizontal furnace, including a hollow body carried by the furnace, the interior of said hollow body provided with webs dividing the same into a plurality of pockets, means for feeding a cooling medium into certain of said pockets, and means for catching the spill of cooling medium from said pockets.

In testimony whereof, I affix my signature.

ADOLPH W. WAERN.